United States Patent [19]

Lapine et al.

[11] 3,867,740
[45] Feb. 25, 1975

[54] METHOD AND APPARATUS FOR PROCESSING SHRIMP

[75] Inventors: Robert L. Lapine, Wells; Bernard C. Brower, Gladstone, both of Mich.

[73] Assignee: Harry H. Bell & Sons, Inc., St. Petersburg, Fla.

[22] Filed: Jan. 24, 1973

[21] Appl. No.: 326,158

[52] U.S. Cl. .................................................. 17/72
[51] Int. Cl. ........................................... A22c 29/00
[58] Field of Search ...................... 17/71, 72, 50, 52

[56]  References Cited
UNITED STATES PATENTS

| | | | |
|---|---|---|---|
| 2,845,654 | 8/1958 | Deal | 17/72 |
| 3,122,777 | 3/1964 | Jonsson | 17/72 |

*Primary Examiner*—Hugh R. Chamblee
*Attorney, Agent, or Firm*—Michael, Best & Freidrich

[57] ABSTRACT

A method and apparatus for processing a de-headed and unshelled shrimp including a conveyor for conveying the shrimp through the various stations of the apparatus, namely, an uncurling station, a cutter station, a spreader station and a cleaning station. The uncurling means at the uncurling station includes a pair of holding blocks adapted to provide a gripping action to the sides of the shrimp as they pass therebetween and a rotating brush member adapted to contact the underside and tail of a shrimp while the gripping action of the blocks is being applied thereto to thereby cause the shrimp to assume a substantially horizontally extended position. The next station is the cutter station which has a cutter means mounted thereat which is comprised of a rotating cutter blade mounted above the travel path of the shrimp for cutting through the belly of the shrimp to the point at which the alimentary canal is located. The shrimp then moves to a spreader station having a spreader means mounted thereat which includes a spreader element having V-shaped cross-sections wherein progressive cross-sections from front to rear become progressively broader, such spreader element being operative for spreading the portions of the shrimp on opposite sides of the cut therein to thereby cause the shrimp to assume a substantially flat position. The final station is a cleaning means mounted thereat for directing a flow of cleaning fluid under pressure onto the exposed upper surface of the shrimp.

28 Claims, 12 Drawing Figures

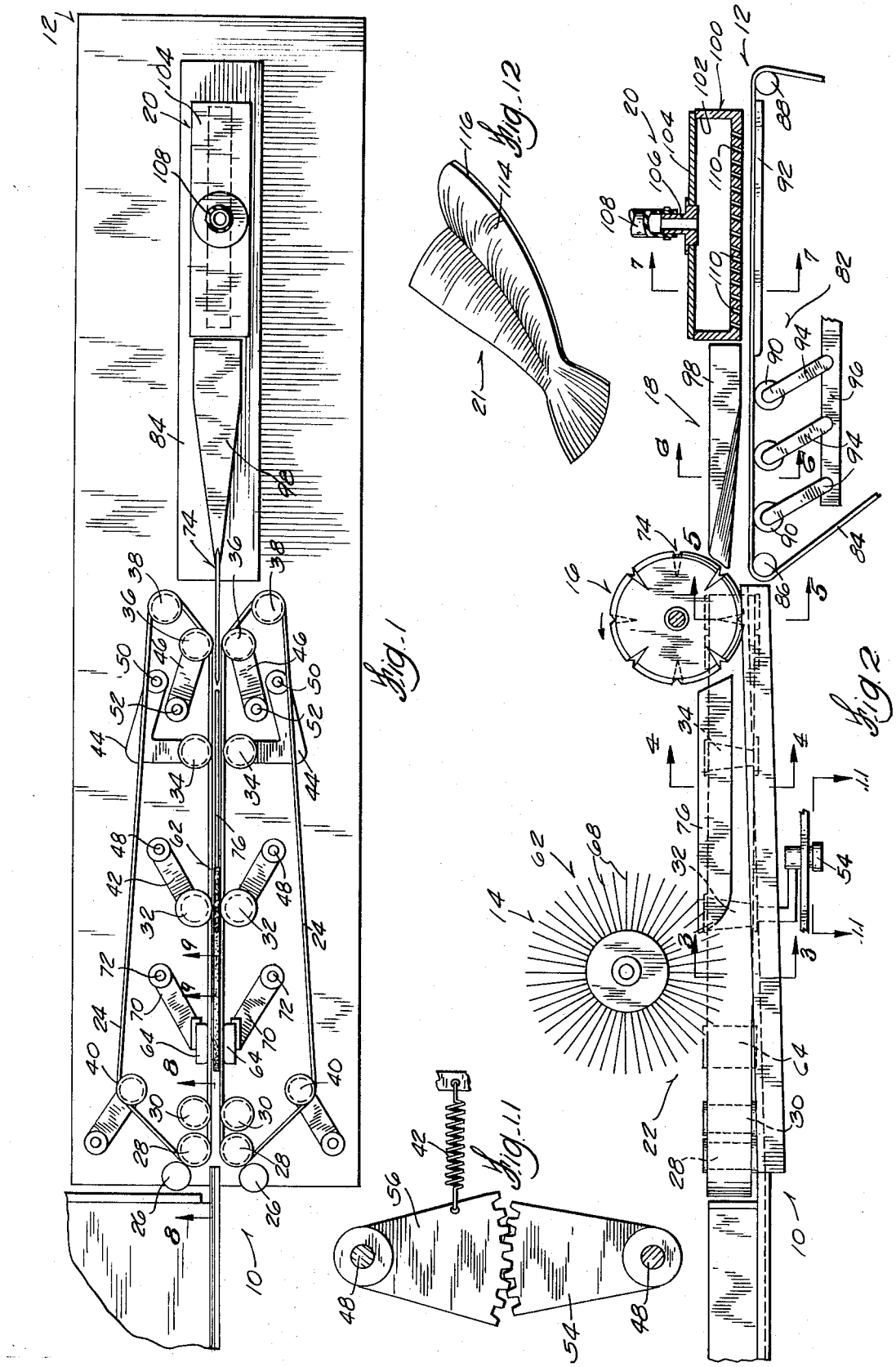

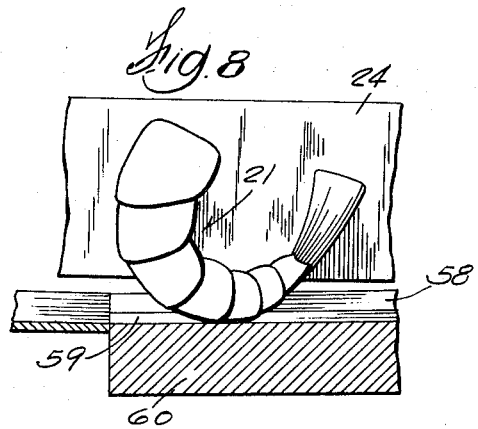
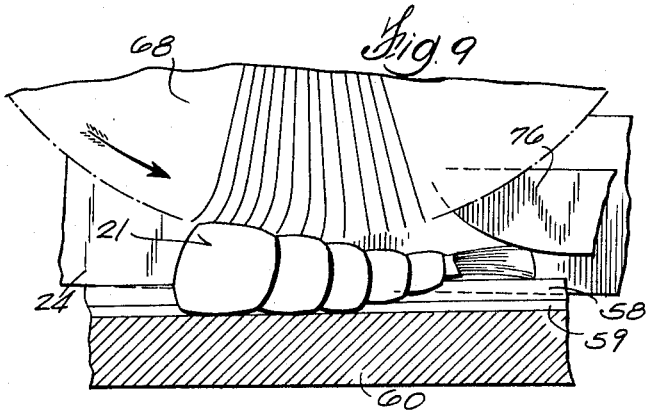
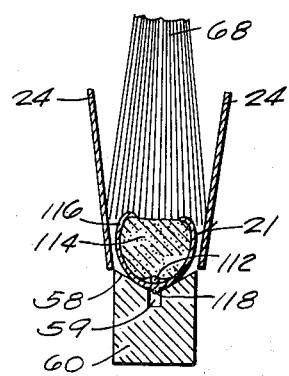
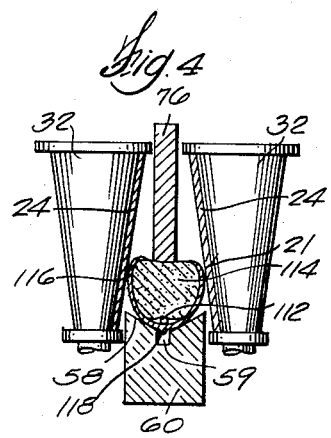
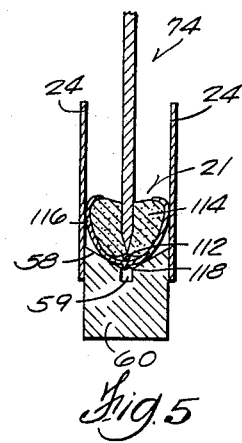
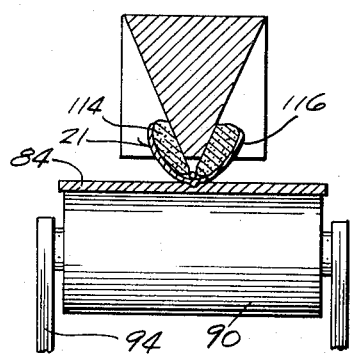
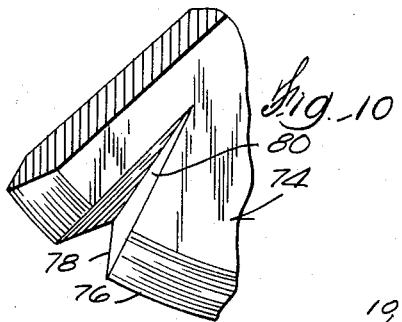
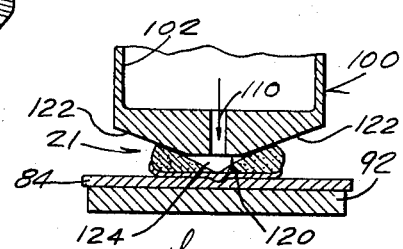

METHOD AND APPARATUS FOR PROCESSING SHRIMP

BACKGROUND OF THE INVENTION

I. Field of the Invention

This invention relates to a method and apparatus for processing shrimp and more particularly it relates to a method and apparatus for processing a so-called Rock Shrimp which has been de-headed but has not had its shell removed. The scientific name of Rock Shrimp is Sicyonia Brevirostris, which are a member of the Penaeidae family.

II. Description of the Prior Art

All known prior machines for deveining shrimp are designed for processing shrimp which have been peeled or shelled prior to the deveining operation. Examples of such prior machines are shown in U.S. Pat. Nos. 2,825,927 and 2,694,218. As indicated above, the present invention is particularly designed for processing Rock Shrimp which is a species of shrimp which is characterized by having a very hard shell. To applicant's knowledge no successful apparatus has ever been designed which is capable of processing a Rock Shrimp in the manner performed by the method and apparatus of the present invention. In the past there has been little or no commercial market for Rock Shrimp because of the fact that there has been no apparatus available for processing them. The principal object of the present invention, therefore, is to provide a method and apparatus for processing what in the past has been a substantially worthless article of commerce into a useful and valuable article of commerce.

SUMMARY OF THE INVENTION

A shrimp processing apparatus comprising an uncurling station having an uncurling means mounted thereat for causing the shrimp moving therethrough to assume a substantially horizontally extended position. The shrimp then moves to a cutter station having a cutter means mounted thereat for cutting through the belly of the shrimp to the alimentary canal of the shrimp. From the cutter station the shrimp moves to a spreader station having a spreader means mounted thereat for spreading the portions of the shrimp on opposite sides of the cut therein to thereby cause the shrimp to assume a substantially flat position. The final station is a cleaning station which has a cleaning means mounted thereat for directing a flow of cleaning fluid under pressure onto the exposed upper surface of the shrimp after they pass through the spreader station. A conveyor means is provided for conveying the shrimp in a continuous movement through the uncurling, cutter, spreader and cleaning stations.

DESCRIPTION OF THE DRAWINGS

FIG. 1 is a top plan view of the shrimp processing apparatus of the present invention;

FIG. 2 is a side elevation view of the apparatus shown in FIG. 1;

FIGS. 3, 4, 5, 6 and 7 are sectional views taken along lines 3—3, 4—4, 5—5, 6—6 and 7—7 of FIG. 2, respectively;

FIGS. 8 and 9 are sectional views taken along lines 8—8 and 9—9 of FIG. 1, respectively;

FIG. 10 is an enlarged fragmentary perspective view of the cutter blade;

FIG. 11 is a sectional view taken along line 11—11 of FIG. 2; and

FIG. 12 is a perspective view of the shrimp after it has been processed by the apparatus of the present invention.

DESCRIPTION OF THE PREFERRED EMBODIMENT

Referring to the drawings in detail, FIGS. 1 and 2 show top and side views of the overall apparatus which has an inlet end 10 and an outlet end 12. The apparatus is comprised of four main operating stations, namely, an uncurling station 14, a cutting station 16, a spreading or flattening station 18 and a cleaning station 20. The de-headed and unshelled shrimp 21, like that shown in FIG. 8, are fed into the apparatus at the inlet end 10. Each shrimp 21 is conveyed from inlet 10 through uncurling station 14 to cutting station 16 by a first conveyor means 22 comprised of a pair of moving belt members 24,24 mounted on opposite sides of the apparatus center line by a plurality of rollers. As shown in FIG. 8, the shrimp are introduced into the space between belts 24,24 tail first with the back of the shrimp in groove 58 of support bar 60. Each belt 24 is mounted and driven by an identical set of rollers which are symmetrically arranged on opposite sides of the apparatus center line as best shown in FIG. 1. Each set of rollers is comprised of a pair of drive rollers 26, 28, a plurality of belt biasing rollers 30, 32, 34, 36, an idler roller 38 and a belt tightening roller 40. Drive rollers 26 and 28 are mounted on stationary axes and are driven by any suitable drive means (not shown) such as an electric motor. Belt biasing rollers 30, 32, 34 and 36 are mounted on movable axes and are biased into engagement with belts 24,24 by any suitable means such as a tension spring 42 as shown in FIG. 11.

Rollers 32, 34 and 36 are mounted for swinging movement into and out of engagement with belts 24 by means of arms 42, 44 and 46 and rotatable shafts 48, 50 and 52, respectively. Each of said rollers 32, 34 and 36 are geared to each other and biased into engagement with belts 24,24 by an arrangement like that shown in FIG. 11. As shown in such FIG. 11, the swinging movement of rollers 32,32 towards and away from the center line of the apparatus is synchronized by a pair of spur gear segments 54,56, fixedly mounted on shafts 48,48. The rollers are biased towards the center line by a tension spring 42.

As best shown in FIG. 4, rollers 32,32 (as well as rollers 34,34 and 36,36) are tapered outwardly from bottom to top. This configuration causes belt 24,24 to assume an inverted V-shape in the area of such rollers which tends to force the shrimp 21 downwardly into engagement with a groove 58 in support bar 60.

As indicated previously, rollers 38,38 serve as idlers and do not have a movable axis. Rollers 40,40 are mounted for swinging movement by arm 62 and shaft 64. The tension in belt 24,24 can be set at the desired amount by swinging rollers 40,40 to the desired position, then locking them in such position by any suitable adjustment mechanism (not shown).

As previously indicated, first conveyor means 22 further includes a support bar 60 having an upwardly opening groove 58 therein for receiving and guiding the shrimp 21 through the machine. A slot 59 is provided in the base of the groove to accommodate the spine of the shrimp as best shown in FIGS. 3, 4 and 5. Bar 60 is mounted directly on the center line of the apparatus and is angled upwardly from the inlet end 10. While the degree of such angle can vary to some extent, in the preferred embodiment it is angled upwardly in the range of about ¼inch–⅜ inch per foot. The purpose of this angular relationship will be explained hereinafter.

The components of the uncurling means at station 14 include a rotating brush member 62 and a pair of holding block members 64,64. Brush member 62 may be of any suitable design which in the preferred embodiment is comprised of a hub 66 having a plurality of plastic bristles 68 extending radially therefrom. The brush is driven by any suitable prime mover such as an electric motor (not shown). Brush 62 is driven in a direction so that the bristles in the area of contact with a shrimp will be moving in substantially the same direction as the shrimp is moving through the machine (see arrow in FIG. 9). Holding block members 64,64 are mounted for swinging movement towards and away from the center line of the machine by means of arms 70,70 and shafts 72,72. The blocks are geared to each other and are biased into contact with belts 24,24 by a spur gear and spring arrangement similar to that shown in FIG. 11. The function of the blocks 64 is to provide a gripping action to the sides of the shrimp as they pass therebetween to prevent the shrimp from being displaced from between the belts by the action of the uncurling brush 62. Thus the blocks 64,64 and brush 62 cooperate to provide the desired uncurling function illustrated in FIG. 9.

The components of the cutter means at cutter station 16 include a cutter blade member 74 and a hold-down bar 76. As best shown in FIGS. 2 and 4, hold-down bar 76 is mounted on the center line of the machine and extends between brush 62 and cutter blade 74. Cutter blade 74 is driven by any suitable prime mover such as an electric motor (not shown). The blade is driven in a direction so that the movement of the cutting edge of the blade in the area of contact with a shrimp will be moving in substantially the same direction as the shrimp is moving through the machine (see arrow in FIG. 2). As best shown in FIG. 10, blade 74 has a cutting edge 76 on the periphery thereof with a plurality of notches 78 cut therein. In addition to notches 78 in edge 76, the blade is provided with a plurality of grooves 80 in opposite side faces of the blade with each such groove extending radially inwardly from each notch 78. The function of notches 78 and grooves 80 will be explained hereinafter.

The first conveyor means 22 as described previously ends at the cutting station 16 where the shrimp pass from such first conveyor means to a second conveyor means 82. Second conveyor means 82 is comprised of a single conveyor belt 84 (partially shown in FIG. 2), mounted on a plurality of rollers. Two of such rollers 86 and 88 have stationary axes. Intermediate such rollers 86 and 88 are provided a plurality of movable rollers 90 and a stationary support platform member 92. Rollers 90 are mounted for swinging movement towards and away from the underside of belt 80 by arms 94 which in turn are pivotally mounted in a support member 96. The rollers 90 are biased into engagement with the underside of belt 84 by any suitable type of spring (not shown).

The next station is the spreader station 18 wherein the principal component is a stationary spreader element 98 mounted on the center line of the machine adjacent the upper horizontally extending segment of belt 84. Element 98 has a shape similar to a deep V boat hull, i.e., successive cross-sections taken from front to rear presents a sharp V-shape at the front and gradually broader V-shapes as you move to the rear until its cross-section becomes substantially rectangular at the end of the element as best shown in FIG. 6.

The final station is the cleaning station 20 wherein the principal component is a cleaning manifold 100 mounted adjacent the upper horizontal extending segment of belt 84 adjacent the outlet end 12 of the apparatus. Manifold 100 is comprised of a hollow body member 102 and a cover member 104 having a nipple 106 for connection to a hose member 108. The bottom of body 102 is provided with a plurality of openings 110. In the preferred embodiment openings 110 are angled approximately 20 degrees with respect to the horizontal to direct the cleaning fluid from inside the manifold onto the shrimp being processed at an angle opposed to that of the movement of the shrimp through the machine.

OPERATION

De-headed and unshelled shrimp 21 are introduced tail first and back down into the inlet end 10 of the machine by manually inserting the individual shrimps between the two belts 24,24 of first conveyor means 22. The shrimp, when introduced into the machine, are generally in a curled-up shape such as that shown in FIG. 8. Also, as shown in FIG. 8, the shrimp when inserted into the first conveyor means are positioned with their backs facing downwardly, with a portion of the shrimp extending into V-groove 58 in support bar 60. After each shrimp is picked up by the moving belts 24,24, it will move continuously through the machine without any further attention or manipulation by the operator. In other words, the processing of the shrimp after they are introduced into the machine is completely automatic.

As best shown in FIGS. 3, 4 and 5, as the shrimp are conveyed by the belts 24,24 of the first conveyor means 22, they will slide in and be guided by the groove 58 in support bar 60 which cooperates with the side belts 24,24 to provide the desired guiding action. The slot 59 in the base of the groove is provided to accommodate the small spine portion 118 of the shrimp. By spring loading the belt biasing rollers 32,32, 34,34 and 36,36, successive shrimp of varying size are readily accommodated.

As a shrimp moves from inlet 10, it will first enter the uncurling station 14. At such station the shrimp is contacted by the bristles 68 of the brush member 62 as shown in FIG. 9. The holding blocks 64,64 are positioned to provide a holding action to the shrimp as they pass between the two blocks, which holding action occurs simultaneously with the brushing action exerted on the shrimp by the brush 62 to thereby prevent any tendency of the shrimp to be rotated out of its position between the two belts 24,24. In other words, the blocks serve to provide a gripping action to the side portions of the shrimp as the shrimp is being uncurled by the action of the brush. As the shrimp moves out of the curling station 14, it will be forced under the hold-down bar 76 as best shown in FIGS. 4 and 9. The hold-down bar serves to retain the shrimp in an extended position in the groove 58 of support bar 60. It will be noted at this point that the tapered rollers 32,32 and 34,34 serve to position the belt in this area in an inverted V-shape configuration which further serves to keep the shrimp snugly in contact with the groove in support bar 60. Also, as previously indicated, the support bar is angled upwardly slightly which in effect causes the shrimp to be moved upwardly into contact with the cutter blade 74 at the cutter station 16.

At cutter station 16 the body portion 114 of the shrimp is cut as best shown in FIG. 5. As shown, the cutting edge 76 of the blade 74 is positioned with respect to support bar 60 so that the blade will cut down into the body 114 of the shrimp only to the point at which the vein or alimentary canal 112 of the shrimp is located and will not cut all the way through the shell 116 of the shrimp. The sharp edges of notches 78 in the cutting edge of the blade serve to loosen and tear out the vein 112 as the shrimp passes beneath the blade. The edges of grooves 80 in the side faces of the blade serve to engage the body 114 of the shrimp and more or less help to move it through the cutting station. In the preferred embodiment the cutter blade is rotated about 1,700 r.p.m. and the brush is rotated about 800 r.p.m.

From the cutting station 16 the shrimp continues to move on to the spreader or flattening station 18. As the shrimp leaves the cutting station, it will move from first conveyor means 22 to the second conveyor means 82. The single belt 84 of second conveyor means 84 will move the shrimp beneath spreader element 98, wherein the front tip portion of the element will be caused to extend into the cut in the shrimp made by the cutter blade as shown in FIG. 6. As the shrimp continues to move under the element 98, it will be flattened or spread from a position like that shown in FIG. 6 to a position like that shown in FIG. 7. The cut and flattened shrimp passes from station 18 to cleaning station 20.

The cleaning operation is performed by introducing a cleaning liquid such as water or a cleaning gas such as air or a combination of water and air into the inside of body member 102 through hose 108 and nipple 106. The cleaning fluid is forced under pressure from inside the manifold 100 through openings 110 onto the exposed and flattened body of the shrimp. As the fluid passes over the shrimp, any remaining portions of the vein or other debris will be washed off of the shrimp. The angled openings 110 cause the cleaning fluid to flow in a direction opposite to that of the movement of the shrimp to thereby enhance the cleaning action produced at station 20. As shown in FIG. 7, the bottom of manifold body member 102 has a flat central portion 120 and angled edge portions 122,122 which together with flattened body of the shrimp provide a space 124 through which the cleaning fluid flows.

The processed shrimp then pass from the cleaning station 20 out the outlet end 12 of the machine. The shrimp are then packaged in any suitable manner. The shrimp after it has been processed as described above will be in a shape like that shown in FIG. 12. The shrimp, as so prepared, can be broiled or cooked in some other suitable manner, and then the flesh of the shrimp can be removed from the shell after cooking by simply gripping the flesh with a fork and pulling it away from the shell. In the preferred embodiment the conveyor belts of conveyor mechanisms 22 and 84 are run at a speed of approximately 40–50 feet per minute, which means that by positioning a shrimp at about 4 inch intervals on the conveyors, it will be possible to process in the neighborhood of 120–150 shrimp per minute.

We claim:

1. Shrimp processing apparatus for processing a deheaded and unshelled shrimp comprising:
    a cutter station having a cutter means mounted thereat for cutting through the belly of a shrimp to the alimentary canal of the shrimp, said cut starting at the tail of said shrimp and leaving the shell uncut;
    a spreader station having a spreader means mounted thereat for spreading the portions of the shrimp on opposite sides of the cut therein to thereby cause the shrimp to assume a substantially flat position with the shell attached to the shrimp; and
    a conveyor means for conveying a shrimp first through said cutter station and then through said spreader station.

2. Shrimp processing apparatus according to claim 1 in which said cutter means includes a rotating cutter blade mounted above the travel path of the shrimp as it is conveyed through said cutter station by said conveyor means.

3. Shrimp processing apparatus according to claim 1 in which said spreader means includes a spreader element having V-shaped cross-sections wherein progressive cross-sections from front to rear become progressively broader.

4. Shrimp processing apparatus for processing a deheaded and unshelled shrimp comprising:
    an uncurling station having an uncurling means mounted thereat for causing the shrimp moving therethrough with the tail leading to assume a substantially horizontally extended position;
    a cutter station having a cutter means mounted thereat for cutting through the belly of a shrimp to the alimentary canal of the shrimp, said cut starting at the tail of said shrimp and leaving the shell uncut;
    a spreader station having a spreader means mounted thereat for spreading the portions of the shrimp on opposite sides of the cut therein to thereby cause the shrimp to assume a substantially flat position with the shell remaining attached to the shrimp; and
    a conveyor means for conveying a shrimp first through said cutter station and then through said spreader station.

5. Shrimp processing apparatus according to claim 4 in which said uncurling means includes a pair of holding blocks adapted to provide an indirect gripping action to the sides of the shrimp as they pass therebetween and a rotating brush member adapted to contact the underside and tail of a shrimp while the gripping action of said blocks is being applied thereto.

6. Shrimp processing apparatus according to claim 5 in which said brush member is rotated in a direction so that the bristles thereof in the area of contact with a shrimp will be moving in substantially the same direction as the shrimp is moving.

7. Shrimp processing apparatus according to claim 4 in which said cutter means includes a rotating cutter blade mounted above the travel path of the shrimp as it is conveyed through said cutter station by said conveyor means.

8. Shrimp processing apparatus according to claim 7 in which said cutter means includes a stationary hold-down bar operable to maintain the shrimp in a substantially horizontally extended position as it enters said cutter station.

9. Shrimp processing apparatus according to claim 7 in which said cutter blade is rotated in a direction so that the movement of the cutting edge of the blade in the area of contact with a shrimp will be moving in substantially the same direction as the shrimp is moving.

10. Shrimp processing apparatus according to claim 7 in which said cutter blade has a plurality of notches formed in the peripheral cutting edge thereof.

11. Shrimp processing apparatus according to claim 10 in which said cutter blade is further provided with a plurality of grooves formed in the sides thereof which grooves extend radially from the peripheral cutting edge thereof.

12. Shrimp processing apparatus comprising:
an uncurling station having an uncurling means mounted thereat for causing the shrimp moving therethrough to assume a substantially horizontally extended position;
a cutter station having a cutter means mounted thereat for cutting through the belly of a shrimp to the alimentary canal of the shrimp;
a spreader station having a spreader means mounted thereat for spreading the portions of the shrimp on opposite sides of the cut therein to thereby cause the shrimp to assume a substantially flat position;
a cleaning station having a cleaning means mounted thereat for directing a flow of cleaning fluid under pressure onto the exposed upper surface of the shrimp after they pass through said spreader station; and
a conveyor means for conveying a shrimp first through said uncurling station, then through said cutter station; then through said spreader station, and then through said cleaning station.

13. Shrimp processing apparatus according to claim 12 in which said conveyor means includes a first conveyor mechanism for conveying the shrimp through said uncurling and cutter stations and a second conveyor mechanism for conveying the shrimp through said spreader and cleaning stations.

14. Shrimp processing apparatus according to claim 13 in which said first conveyor mechanism includes a support bar member for supporting a shrimp thereon and a pair of conveyor belts mounted on opposite sides of the shrimp supported on said bar, said belts operable to engage the sides of a shrimp and slide it along the top surface of said support bar.

15. Shrimp processing apparatus according to claim 14 in which said support bar is angled upwardly along the path of travel of the shrimp thereon.

16. Shrimp processing apparatus according to claim 14 in which said support bar has a groove in the top surface thereof to accommodate the back portion of a shrimp therein.

17. Shrimp processing apparatus according to claim 16 in which there is a slot in the base of said groove to accommodate the spine of the shrimp therein.

18. Shrimp processing apparatus according to claim 14 in which said first conveyor mechanism further includes a plurality of pairs of belt biasing rollers mounted on opposite sides of said conveyor belt, said rollers being mounted on movable axes and biased into contact with said conveyor belt.

19. Shrimp processing apparatus according to claim 18 in which at least one pair of said belt biasing rollers is tapered outwardly from bottom to top.

20. Shrimp processing apparatus according to claim 13 in which said second conveyor mechanism includes a conveyor belt having a horizontally extending segment which moves beneath said flattening and cleaning stations.

21. Shrimp processing apparatus according to claim 12 in which said uncurling means includes a pair of holding blocks adapted to provide a gripping action to the sides of the shrimp as they pass therebetween and a rotating brush member adapted to contact the underside and tail of a shrimp while the gripping action of said blocks is being applied thereto.

22. Shrimp processing apparatus according to claim 12 in which said cutter means includes a rotating cutter blade mounted above the travel path of the shrimp as it is conveyed through said cutter station by said conveyor means.

23. Shrimp processing apparatus according to claim 22 in which said cutter means includes a stationary hold-down bar operable to maintain the shrimp in a substantially horizontally extended position as it enters said cutter station.

24. Shrimp processing apparatus according to claim 23 in which said cutter blade has a plurality of notches formed in the peripheral cutting edge thereof.

25. Shrimp processing apparatus according to claim 24 in which said cutter blade is further provided with a plurality of grooves formed in the sides thereof which grooves extend radially from the peripheral cutting edge thereof.

26. Shrimp processing apparatus according to claim 12 in which said cleaning means includes a cleaning manifold and enclosed space inside thereof in which a cleaning fluid under pressure in introduced, said cleaning manifold further provided with a plurality of openings therein which communicate with said enclosed space, said openings positioned to direct a flow of cleaning fluid onto the exposed upper surface of the shrimp after they pass through said spreader station.

27. Shrimp processing apparatus according to claim 26 in which said openings are disposed at an angle with the horizontal to cause the cleaning fluid to flow in a direction opposite to that of the movement of the shrimp to thereby enhance the cleaning action produced at said cleaning station.

28. Shrimp processing apparatus according to claim 12 in which said spreader means includes a spreader element having V-shaped cross-sections wherein progressive cross-sections from front to rear become progressively broader.

* * * * *